US012645676B1

(12) United States Patent
Su et al.

(10) Patent No.: US 12,645,676 B1
(45) Date of Patent: Jun. 2, 2026

(54) COMPUTATIONAL STORAGE DEVICE, COMPUTATIONAL STORAGE SYSTEM AND OPERATION METHOD FOR DiskANN SEARCH

(71) Applicant: MACRONIX INTERNATIONAL CO., LTD., Hsinchu (TW)

(72) Inventors: Wei-Cheng Su, New Taipei City (TW); Chih-Hsiang Yang, New Taipei City (TW); Hsiang-Lan Lung, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

(21) Appl. No.: 18/964,613

(22) Filed: Dec. 1, 2024

(51) Int. Cl.
*G06F 16/2455* (2019.01)
*G06F 16/22* (2019.01)
*G06F 16/248* (2019.01)

(52) U.S. Cl.
CPC .... *G06F 16/24553* (2019.01); *G06F 16/2228* (2019.01); *G06F 16/248* (2019.01)

(58) Field of Classification Search
None
See application file for complete search history.

(56) References Cited

U.S. PATENT DOCUMENTS 12,481,666 B1 * 11/2025 Jain .................... G06F 16/24578
2015/0106548 A1 * 4/2015 Dubois ................. G06F 3/0619
713/2

2019/0392058 A1 * 12/2019 Konow Krause ... G06F 16/2237
2021/0117425 A1 * 4/2021 Rao ...................... H04L 41/0806
2024/0320231 A1 * 9/2024 Bhattacharjee ....... G06F 9/5066
2024/0330260 A1 10/2024 Xie et al.
2025/0245269 A1 * 7/2025 Tatsuno ............. G06F 16/9024
2025/0265239 A1 * 8/2025 Wang ................. G06F 16/9535
2025/0284680 A1 * 9/2025 Aggarwal ........... G06F 16/2456

(Continued)

FOREIGN PATENT DOCUMENTS

CN 116150304 A 5/2023
TW I822162 B 11/2023

OTHER PUBLICATIONS

OOD-DiskANN: Efficient and Scalable Graph ANNS for Out-of-Distribution Queries (Year: 2022).*

(Continued)

*Primary Examiner* — Kim T Nguyen
(74) *Attorney, Agent, or Firm* — McClure, Qualey & Rodack, LLP

(57) ABSTRACT

A computational storage device for executing DiskANN search is provided by an aspect of the present disclosure. The computational storage device comprises a NAND memory array configured to storage node chunks corresponding to nodes in the DiskANN. The computational storage device also comprises a non-volatile memory array configured to store multiple product quantization (PQ) vectors corresponding to the nodes of the node chunks. The computational store device also comprises a processing unit coupled to the NAND memory array and the non-volatile memory array. The processing unit configured to execute DiskANN search (DiskANNs) among the node chunks in the NAND memory array and the multiple PQ vectors in the non-volatile memory array according to a received search instruction, and output a search result.

15 Claims, 5 Drawing Sheets

(56) References Cited

U.S. PATENT DOCUMENTS

| | | | |
|---|---|---|---|
| 2026/0037162 A1* | 2/2026 | Wei | G06F 3/0625 |
| 2026/0064698 A1* | 3/2026 | Zhang | G06F 16/3347 |
| 2026/0079982 A1* | 3/2026 | Khan | G06F 16/3347 |
| 2026/0093734 A1* | 4/2026 | Mukherjee | G06F 16/3329 |

OTHER PUBLICATIONS

High-Throughput Vector Similarity Search in Knowledge Graphs (Year: 2023).*
Fong, et al.: "Phase-Change Memory—Towards a Storage-Class Memory"; IEEE Transactions on Electron Devices, vol. 64, No. 11, Nov. 2017.
Subramanya, et al.: "DiskANN: Fast Accurate Billion-point Nearest Neighbor Search on a Single Node"; 33rd Conference on Neural Information Processing Systems (NeurIPS 2019), Vancouver, Canada; pp. 1-11.
Ni, et al.: "DiskANN++: Efficient Page-based Search over Isomorphic Mapped Graph Index using Query-sensitivity Entry Vertex"; arXiv:2310.00402v1 [cs.IR] Sep. 30, 2023; pp. 1-14.

* cited by examiner

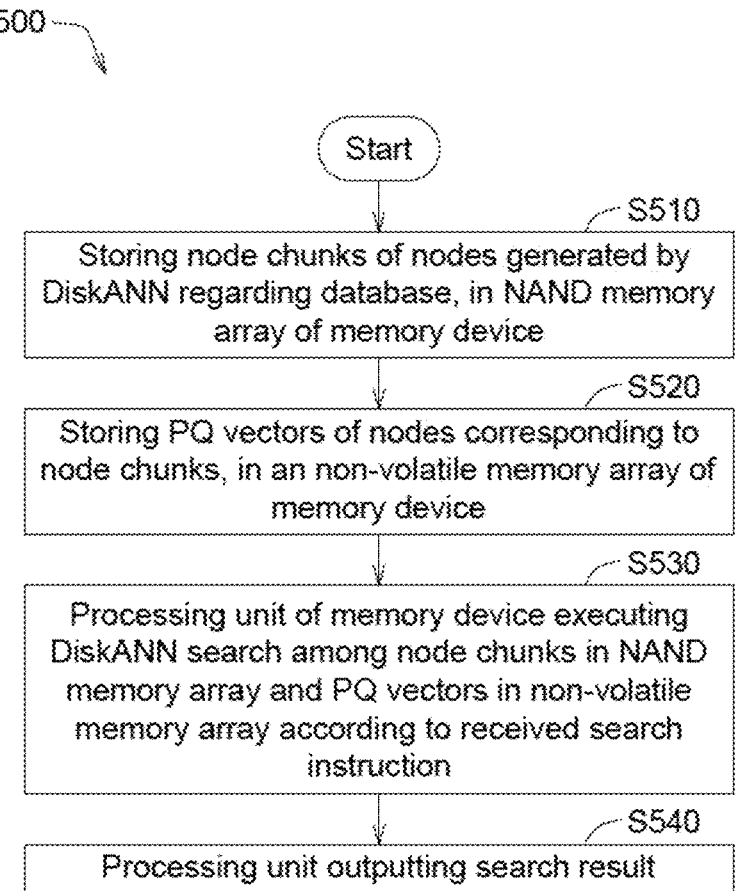

500

Start

S510
Storing node chunks of nodes generated by DiskANN regarding database, in NAND memory array of memory device S520
Storing PQ vectors of nodes corresponding to node chunks, in an non-volatile memory array of memory device S530
Processing unit of memory device executing DiskANN search among node chunks in NAND memory array and PQ vectors in non-volatile memory array according to received search instruction S540
Processing unit outputting search result

FIG. 5

COMPUTATIONAL STORAGE DEVICE, COMPUTATIONAL STORAGE SYSTEM AND OPERATION METHOD FOR DiskANN SEARCH

TECHNICAL FIELD

The present disclosure relates in general to techniques of computational storage device for DiskANN search (DiskANNs), and more particularly, to computational storage system and operating method for DiskANNs.

BACKGROUND

Nowadays, when processing searches of large-scale database, related techniques of Approximate Nearest Neighbor search (ANNs) are implemented, such as using ANNs algorithms to perform vector searches. Conventional graph-based ANNs methods, such as HNSW (Hierarchical Navigable Small World) or NSG (Navigating Spread-out Graph), usually consume substantial amounts of dynamic random-access memory (DRAM) to achieve the required performance. DiskANN technology provided by Microsoft can execute ANNs on disk devices, such as solid-state drives (SSD), which can reduce the use of DRAM. However, since DRAM is expensive and volatile, processing very large databases or managing multiple databases on SSD may cause DiskANN to also use large amounts of DRAM or perform DRAM accesses frequently, such as repeated Data is loaded from SSD to DRAM, increasing the cost of DRAM usage. For example, data needs to be loaded repeatedly from SSD to DRAM, which increases the cost of DRAM usage. Thus there are needs for techniques that reduce DRAM usage in DiskANN search (DiskANNs).

SUMMARY

A system of one or more computers is configurable to perform particular operations and/or actions by virtue of having software, firmware, hardware, or a combination thereof installed on the system that in operation cause the system to perform and/or control the operations and/or actions. One or more computer programs are configurable to perform particular operations and/or actions by virtue of including instructions that, when executed by data processing apparatus, cause the apparatus to perform the operations and/or actions.

The first aspect of the present disclosure features a computational storage device for disk approximate nearest neighbor (DiskANN) search. The computational storage device includes a NAND memory array, configured to store multiple node chunks corresponding to multiple nodes of the DiskANN. The computational storage device also includes a non-volatile memory array, configured to store multiple product quantization (PQ) vectors corresponding to the multiple nodes in the multiple node chunks. The computational storage device also includes a processor unit, coupled to the NAND memory array and the non-volatile memory array. The processor unit is configured to: execute DiskANN search among the plurality of node chunks in the NAND memory array and the multiple PQ vectors in the non-volatile memory array according to a received search instruction, and output a search result. Other embodiments of this aspect include corresponding computer systems, apparatus, and computer programs recorded on one or more computer storage devices, each configured to perform the actions of the methods.

The second aspect of the present disclosure features a computational storage system for DiskANN search. The computational storage system includes a computational storage device. The computational storage device includes a NAND memory array, configured to store multiple node chunks corresponding to a plurality of nodes of the DiskANN. The computational storage device also includes comprises a processor unit, coupled to the NAND memory array. The computational storage system also includes a non-volatile memory device including a non-volatile memory array configured to store multiple PQ vectors corresponding to the multiple nodes in the multiple node chunks. The non-volatile memory device is coupled to the processor unit, and the processor unit is configured to: execute DiskANN search among the multiple node chunks in the NAND memory array of the computational storage device and the multiple of PQ vectors in the non-volatile memory array of the non-volatile memory device according to a received search instruction, and output a search result. Other embodiments of this aspect include corresponding computer systems, apparatus, and computer programs recorded on one or more computer storage devices, each configured to perform the actions of the methods.

The third aspect of the present disclosure features an operation method for a memory device. The operation method includes storing multiple node chunks of multiple nodes generated by a DiskANN regarding a database, in a NAND memory array of the memory device. The operation method also includes storing multiple PQ vectors corresponding to the multiple nodes in the multiple node chunks, in a non-volatile memory array of the memory device. The operation method also includes executing, by a processing unit of the memory device, a DiskANN search among the multiple of node chunks in the NAND memory array and the multiple of PQ vectors in the non-volatile memory array according to a received search instruction, and outputting a search result. Other embodiments of this aspect include corresponding computer systems, apparatus, and computer programs recorded on one or more computer storage devices, each configured to perform the actions of the methods.

The details of one or more disclosed implementations are set forth in the accompanying drawings and the description below. Other features, aspects, and advantages will become apparent from the description, the drawings and the claims.

BRIEF DESCRIPTION OF THE DRAWINGS

FIG. 5 is a flowchart illustrating a procedure for executing DiskANN on a memory device, according to some implementations of the present disclosure.

Figure 1:
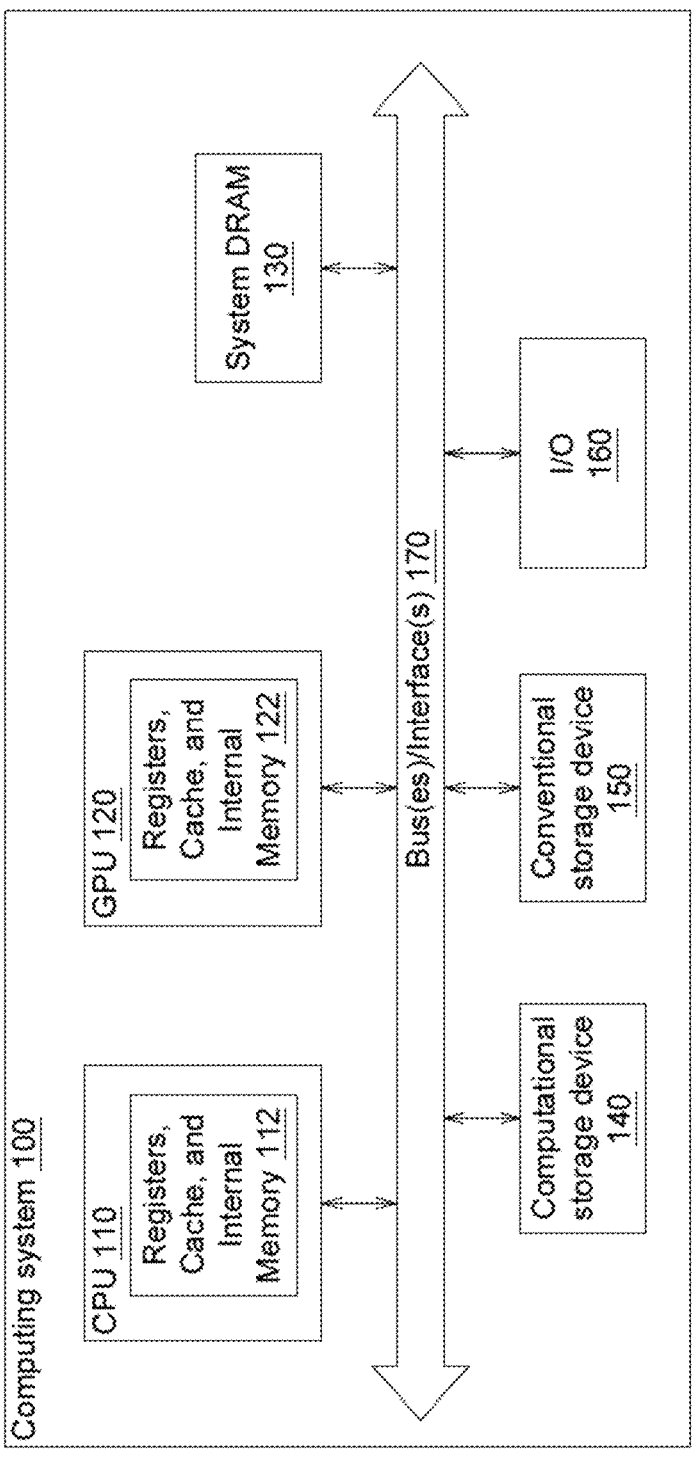
FIG. 1 is a diagram illustrating an example computing system including a computational storage device, according to some implementations of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

One or more flow diagrams are described herein. Processing described by the flow diagrams is implementable and/or directable using processors programmed using computer programs stored in memory accessible to computer systems and executable by the processors, using dedicated logic hardware (including field programmable integrated circuits), and using various combinations thereof. Various actions are combinable, performable in parallel, and/or performable in a different sequence without affecting processing achieved. In some cases, a rearrangement of actions achieves identical results only if certain other changes are made as well. In other cases, a rearrangement of actions achieves identical results only if certain conditions are satisfied. Furthermore, for clarity, some of the flow diagrams herein omit certain some actions not necessary for understanding the disclosed techniques. Various additional actions are performable before, after, and/or between the illustrated actions.

Techniques based on computational storage device or computational storage system, as described herein, reduces processor utilization and/or bus bandwidth utilization. The system is enabled to perform computational techniques (e.g., searching, computing, and/or accessing) using resources of computational storage device, such as computational SSD, rather than processor and/or bus resources, thus reducing or minimizing information movement between processing elements and storage devices. Computational storage device technology enables managing, organizing, selecting, and analyzing ever increasing data volume in real time. Thus, processing, storage, and bandwidth requirements of a system are reduced by using the computational storage device.

Moreover, using computational storage device enables using CPU and/or GPU resources for other tasks, enabling fast results. In some usage scenarios, using computational storage device reduces needs for purchasing additional processors and/or servers. In some usage scenarios, using computational storage device reduces needs for purchasing additional power and/or cooling resources. In some usage scenarios, using computational storage device enables new insights and opportunities using self-processing technology for accelerating a variety of applications. Example applications that computational storage device technology is applicable to include video processing, database management, and artificial intelligence.

An example of computational storage device or computational storage system is enabled to perform DiskANN search and output a search result. For example, a portion of computational storage device is dedicated to the computing (search) function, and another portion of the computational storage device, such as various types of memory array, is dedicated to the second function.

FIG. 1 is diagram illustrating an example computing system 100 including a computational storage device 140, according to some implementations of the present disclosure. The computing system 100 comprises a CPU 110, a GPU 120, a RAM 130, a computational storage device 140, a conventional storage device 150 and I/O 160 that are coupled by Bus(es)/Interface(s) 170. In some implementations, the computational storage device 140 can include computational SSD. In some implementations, the computational storage device 140 can be replaced by a computational storage system similar to the computational storage device 140, such as the computational storage system 200 of FIGS. 4A and 4B. Examples of the computational storage device 140 can execute functions related to computational storage device, such as DiskANN search (or DiskANNs).

The CPU 110 comprises one or more processing units, such as any combination of hardware units enabled to execute programmed instructions, microprocessors, signal processors, AI processors, and the like. One or more of the processing units optionally comprise one or more internal registers (some of which are optionally architecturally visible), one or more cache memories, and/or one or more internal memories (such as relating to buffering and/or coalescing), as represented by Registers, Cache, and Internal Memory 112.

The GPU 120 comprises one or more processing units, such as any combination of units enabled to accelerate processing for processing that is subject to relatively highly parallel processing, such as graphics processing, signal processing, and/or AI processing. Similar to Registers, Cache, and Internal Memory 112 of CPU 110, one or more of the processing units optionally comprise one or more internal registers (some of which are optionally architecturally visible), one or more cache memories, and/or one or more internal memories (such as relating to buffering and/or coalescing), as represented by Registers, Cache, and Internal Memory 122.

The system DRAM 130 comprises one or more DRAM device for storage of instructions and/or data in greater quantities than storage internal to CPU 110 and/or GPU 120.

The computational storage device 140 can be enabled to execute DiskANN search among the data in the computational storage device 140 without transferring those data to the CPU 110, the system DRAM 130 and/or the GPU 120.

The conventional storage device 150 comprises one or more storage elements, such as flash-based storage elements of a SSD, or rotation-based magnetic and/or optical non-volatile storage elements (e.g., disks) of HDD, for storage of instructions and/or data. SDD is optionally accessible with reduced latency compared to HDD.

The I/O 160 comprises elements to interface any combination of the CPU 110, the GPU 120, the system DRAM 130, the computational storage device 140, and/or the conventional storage device 150 to elements external to the computing system 100. Example external elements include mass storage devices, local and wide-area networks (such as the Internet), human interface components (such as keyboards, mice, and/or monitors), and other elements providing capabilities to extend and/or augment capabilities not otherwise provided by the computing system 100.

The Bus(es)/Interface(s) 170 enables communication between the elements coupled to it (e.g., he CPU 110, the GPU 120, the system DRAM 130, the computational storage device 140, the conventional storage device 150 and/or the I/O 160). The Bus(es)/Interface(s) 170 variously comprises one or more serial and/or parallel communication channels as well as optional protocol conversion and/or adaptation capabilities to facilitate communication between the elements coupled to it.

The computing system 100 including the computational storage device 140 enables reduced or minimized data movement between conventional processing elements (e.g., the CPU 110 and/or the GPU 120) and computational storage elements (e.g., the computational storage device 140). DiskANNs operations are performed on the computational storage device 140, using locally stored data available on the computational storage device 140.

Other partitionings of elements, coupling between elements, and capabilities and/or capacities of elements illustrated in the figure are contemplated, as well as additional elements, according to usage requirements.

The computational storage device resources are usable in various systems (such as systems using computational storage device), such as computing servers, database servers and AI accelerators. The techniques of computational storage device provided by the present disclosure can be used to store relevant data generated by DiskANN, and to search the relevant data stored in the computational storage device locally. DiskANN and DiskANN searching operations on computational storage device will be detailed described referring to FIGS. 2 to 4B as follows.

Figure 2:
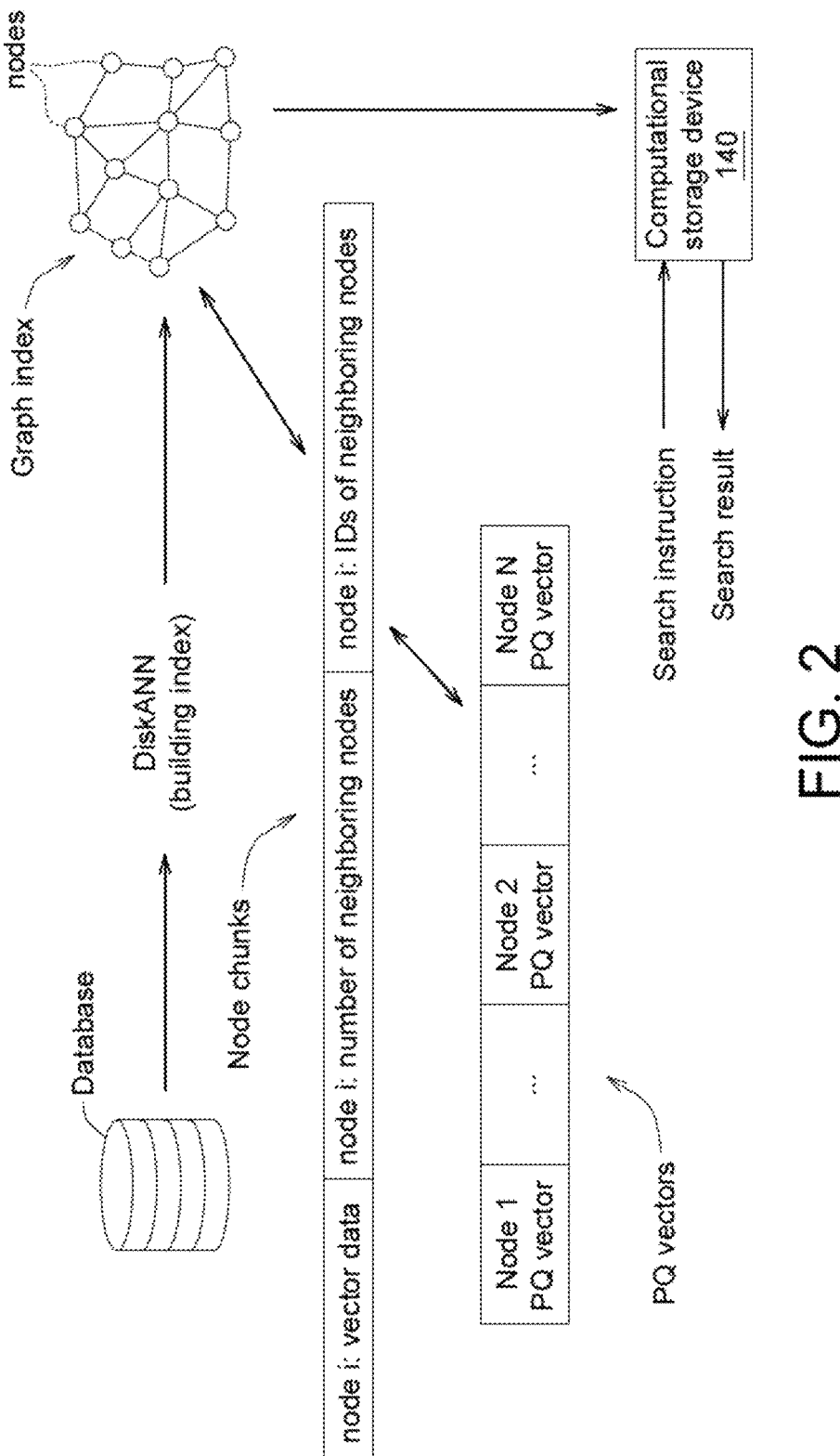
FIG. 2 is a diagram illustrating implementing functions related to DiskANN on the computational storage device 140 of FIG. 1, according to some implementations of the present disclosure.

FIG. 2 is a diagram illustrating implementing functions related to DiskANN on the computational storage device 140 of FIG. 1, according to some implementations of the present disclosure. In applications of DiskANN (such as executed by the computing system 100 of FIG. 1), index of target database can be built, by DiskANN algorithms for example, while generating a graph index (such as random Vamana graph). Corresponding to the graph index, the index includes data of each nodes in the graph, for searching the data of the database according to the graph index, such as vector searches. Specifically, index generated by DiskANN algorithms regarding a database, can include node chunks (which include node vector data (including full vector representing the length and quantity of data), number of neighboring nodes, and identifiers of neighboring nodes) and product quantization (PQ) vectors corresponding to nodes corresponding to identifiers of neighboring nodes in the node chunks. The graph index and relevant nodes data (including node chunks and PQ vectors) in the index can be stored in the computational storage device 140, for further executing DiskANN search among this index data stored in the computational storage device 140. Graph index and relevant nodes data in the index may be stored in NAND memory arrays of the computational storage device 140. However, when performing DiskANN search or when restarting the system, a large amount of PQ vector data may need to be read into DRAM for subsequent processing, which increases the need for DRAM in the computational storage device 140 and the cost of using DRAM. In this regard, the techniques of computational storage device provided by the present disclosure changes the storage method of the relevant node data in the index through the architecture of the computational storage device or the computational storage system, which can reduce the number of installed DRAM and usage of DRAM in computational storage devices or computational storage system, which will be detailed described referring to FIGS. 3A to 4B as follows.

Figure 3A:
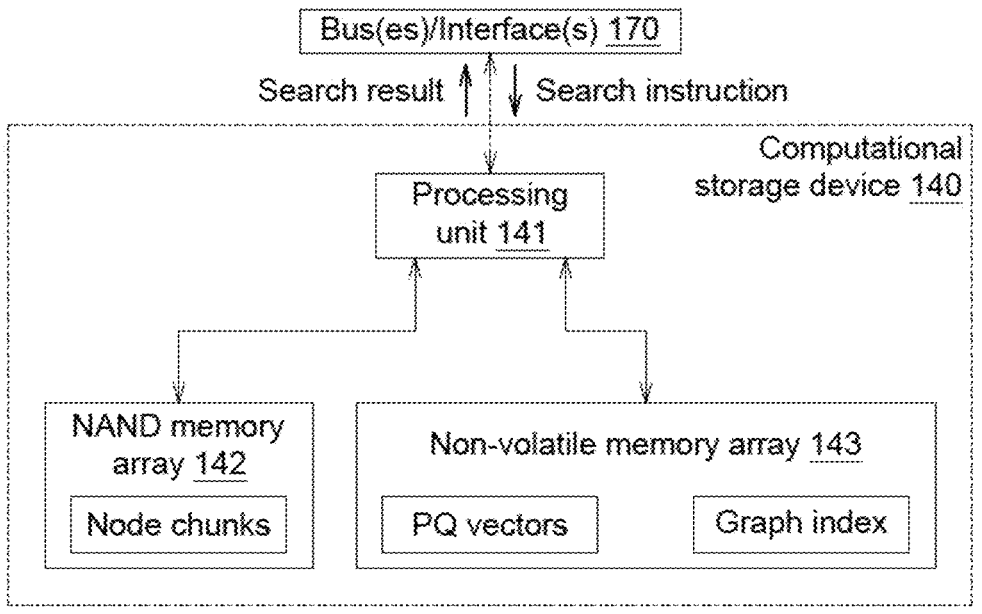
FIGS. 3A and 3B are diagrams illustrating various examples of computational storage device, according to some implementations of the present disclosure.
Figure 3B:
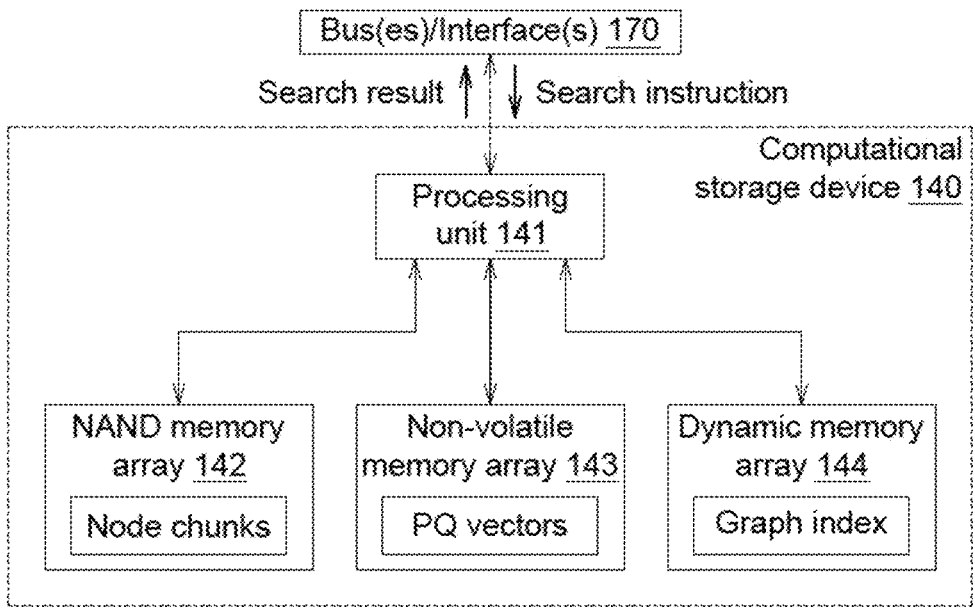

FIGS. 3A and 3B are diagrams illustrating various examples of computational storage device 140, according to some implementations of the present disclosure. As shown by FIGS. 3A and 3B, the computational storage device 140 comprises the processing unit 141, the NAND memory array 142 and the non-volatile memory array 143.

The processing unit 141 is coupled to the NAND memory array 142 and the non-volatile memory array 143. The processing unit 141 can be implemented as field programmable integrated circuit, FPGA, with build-in processor, and able to access the NAND memory array 142 and the non-volatile memory array 143 through controllers.

The NAND memory array 142 is configured to store node chunks corresponding to nodes in the DiskANN. As discussed above, the node chunks includes node vector data (including full vector representing the length and quantity of data), number of neighboring nodes, and identifiers of neighboring nodes.

The non-volatile memory array 143 is configured to store PQ vectors to respective nodes corresponding to identifiers of neighboring nodes in the node chunks. In some implementations, the non-volatile memory array 143 can be implemented as phase change memory (PCM) array, NOR memory array, 3D NOR memory array, magnetoresistive random access memory (MRAM) array, resistive random access memory (RRAM) array, or other non-volatile memory arrays. In some implementations, the non-volatile memory array 143 includes non-volatile memory with accessing speed faster than that of NAND memory. Since the non-volatile memory, such as PCM, has faster accessing speed than NAND memory, by storing PQ vectors in the non-volatile memory, when DiskANN search is executed or the system is rebooted, the processing unit 141, for example, can directly access PQ vectors in the non-volatile memory rapidly, without additional DRAM for accessing PQ vectors, which can decrease the requirements of DRAM installation. Moreover, the cost of non-volatile memory, such as PCM, is lower than that of DRAM, thus the hardware cost can be also decreased.

Accordingly, the processing unit 141 can execute DiskANN search among the node chunks in the NAND memory array 142 and the PQ vectors in the non-volatile memory array 143 according to the received search instruction (such as from the Bus (es)/Interface(s) 170), and output a search result (such as to the Bus(es)/Interface(s) 170).

In the example of FIG. 3A, graph index (such as random Vamana graph) is directly stored in the non-volatile memory array 143. Conversely, in the example of FIG. 3B, graph index (such as random Vamana graph) is stored in the dynamic memory array 144 disposed on the computational storage device 140. In some implementations, the dynamic memory array 144 can be implemented as dynamic random-access memory (DRAM) array, instead of the non-volatile memory array. In this case, only few DRAMs are needed to be installed for storing generated graph index.

Specifically, when the computational storage device 140 executes DiskANN search, according to the received search instruction, the processing unit 141 compares the graph index with a query condition of the search instruction (such as query vector) to obtain a near node of the nodes, in the node chunks, corresponding to comparison of the graph index. Then, the processing unit 141, based on respective identifiers of neighboring nodes of the near node, in the node chunks stored in the NAND memory array 142, obtains respective PQ vectors of neighboring nodes corresponding to the respective identifiers of neighboring nodes of the near node, from the PQ vectors stored in the non-volatile memory array 143. As following, the processing unit 141 compares the respective PQ vectors of the neighboring nodes of the near node for obtaining a nearest node nearest to the query condition, from the neighboring nodes. The processing unit 141 then uses the nearest node as the near node and repeating the above steps until k nodes nearest to the query condition are obtained, which search result includes the k nodes as a Top-K search result. K is an integer greater than or equal to one.

Figure 4A:
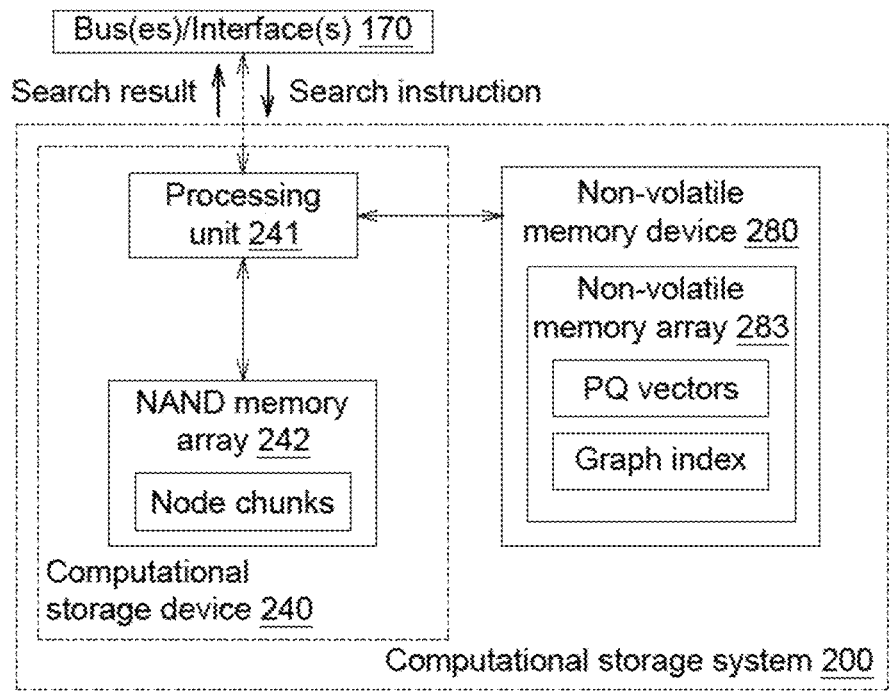
FIGS. 4A and 4B are diagrams illustrating various examples of computational storage system, according to some implementations of the present disclosure.
Figure 4B:
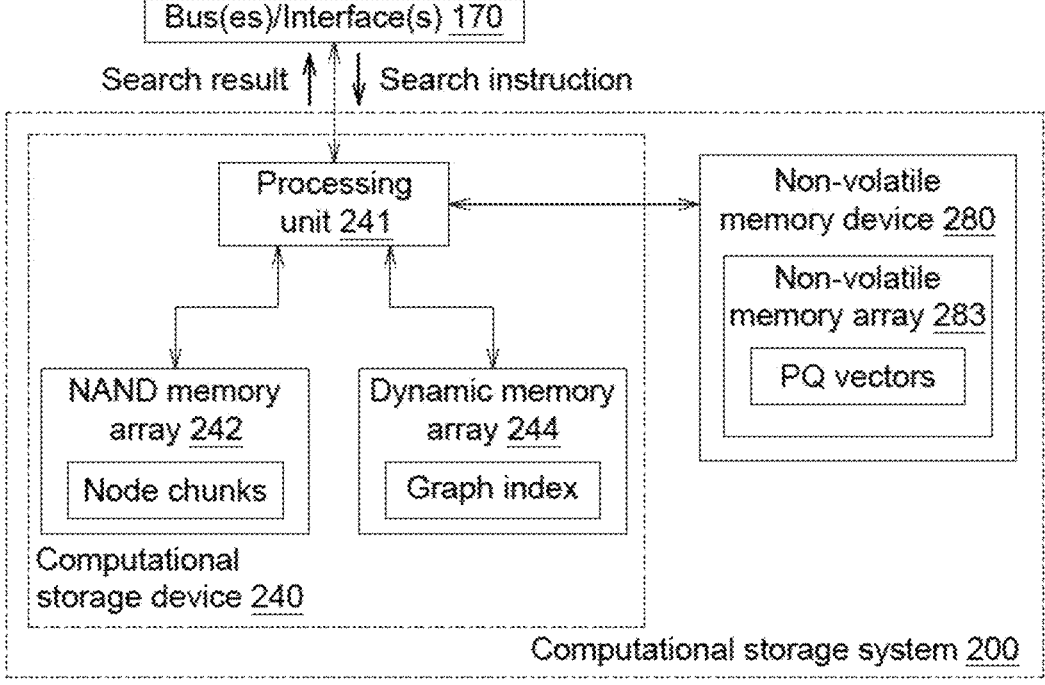

FIGS. 4A and 4B are diagrams illustrating various examples of computational storage system 200, according to some implementations of the present disclosure. The different between the computational storage system 200 of FIG. 4A or 4B, and the computational storage device 140 of FIG.

3A or 3B is that the non-volatile memory array 283 for storing PQ vectors is disposed on an external the non-volatile memory device 280, instead of disposed in the computational storage device 240. The non-volatile memory device 280 is coupled to the processing unit 241 of the computational storage device 240. In some implementations, the non-volatile memory array 283 can be implemented as PCM array, NOR memory array, 3D NOR memory array, MRAM array or RRAM array. Similarly with FIG. 3A, in the example of FIG. 4A, the graph index (such as random Vamana graph) is directly stored in the non-volatile memory array 283, without additionally installing dynamic memory, such as DRAM. Conversely, similarly with FIG. 3B, in the example of FIG. 4B, the graph index (such as random Vamana graph) is stored in the dynamic memory array 244 of the computational storage device 240. In some implementations, the dynamic memory array 244 can be implemented as dynamic random-access memory (DRAM) array. In this case, only few DRAM need to be installed for storing generated graph index. In some implementations, the dynamic memory array 244 can be implemented as DRAM array. In this case, only few DRAMs are needed to be installed for storing generated graph index.

Similarly with the computational storage device 140 of FIG. 3A or 3B, the processing unit 241 of the computational storage device 240 of the computational storage system 200 in the FIG. 4A or 4B can execute DiskANN search among the node chunks in the NAND memory array 242 and the PQ vectors in the non-volatile memory array 283 of the non-volatile memory 280 according to the received search instruction (such as from the Bus (es)/Interface(s) 170), and output a search result (such as to the Bus(es)/Interface(s) 170). DiskANN search execution in the computational storage system 200 in FIG. 4A or 4B is similar to the description above referring to FIGS. 3A and 3B, and will not be repeated here.

FIG. 5 is a flowchart illustrating a procedure 500 for executing DiskANN on a memory device (such as the computational storage device 140 of FIG. 1, 2, 3A or 3B, or the computational storage system 200 of FIG. 4A or 4B), according to some implementations of the present disclosure. In step S510, the computing system 100 of FIG. 1 for example, stores node chunks of nodes generated by DiskANN regarding a database, in a NAND memory array (such as the NAND memory array 142 of FIG. 3A or 3B, or the NAND memory array 242 of FIG. 4A or 4B) of the memory device.

In step S520, the computing system 100 of FIG. 1 for example, stores PQ vectors of nodes corresponding to the node chunks, in an non-volatile memory array (such as the non-volatile memory array 143 of FIG. 3A or 3B, or the non-volatile memory array 283 of FIG. 4A or 4B) of the memory device.

In step S530, a processing unit (such as the processing unit 141 of FIG. 3A or 3B, or the processing unit 241 of FIG. 4A or 4B) of the memory device executes DiskANN search among the node chunks in the NAND memory array and the PQ vectors in the non-volatile memory array according to a received search instruction.

In step S540, the processing unit of the memory device outputs a search result.

In certain configurations, each node chunk comprises a node vector data, a number of neighboring nodes, and identifiers of neighboring nodes, of each node.

In certain configurations, the processor unit executing DiskANN search while receiving the search instruction comprises: comparing a graph index corresponding to the node chunks, with a query condition of the search instruction, to obtain a near node of the nodes, in the node chunks, corresponding to comparison of the graph index; based on respective identifiers of neighboring nodes of the near node, in the node chunks stored in the NAND memory array, obtaining respective PQ vectors of neighboring nodes corresponding to the respective identifiers of neighboring nodes of the near node, from the PQ vectors stored in the non-volatile memory array; comparing the respective PQ vectors of the neighboring nodes of the near node for obtaining a nearest node nearest to the query condition, from the neighboring nodes; and using the nearest node as the near node and repeating the above steps until k nodes nearest to the query condition are obtained, which search result includes the k nodes as a Top-K search result. K is an integer greater than or equal to one.

In certain configurations, the graph index stores in the non-volatile memory array. The non-volatile memory array is a PCM array, a NOR memory array, a 3D NOR memory array, a MRAM array or a RRAM array.

In certain configurations, the graph index stores in a dynamic memory array of the memory device, and the dynamic memory array is coupled to the processing unit.

In certain configurations, the non-volatile memory array is a PCM array, a NOR memory array, a 3D NOR memory array, a MRAM array or a RRAM array. The dynamic memory array is a DRAM array.

Example memory technologies applicable to memory arrays of computational storage device or system, such as computational SSDs, as disclosed herein include floating-gate, split-gate, SONOS, floating dot, DRAM, DRAM-like (e.g., 2TOC), FeFET, and any memory technology compatible with search via word lines and bit lines. Exemplary SONOS memory technology (sometimes referred to as charge trap memory) uses an insulating layer (e.g., of silicon nitride) with traps to capture and retain charge as injected from a channel. Exemplary floating dot memory technology conceptually replaces a floating gate with a floating silicon nanodot or embeds floating silicon nanodots in a polysilicon gate. Exemplary 2TOC memory technology uses parasitic capacitance of a read transistor to store charge rather than an explicit storage capacitor. Exemplary FeFET memory technology uses permanent electrical field polarization of ferro-electric material embedded between a gate and a source-gate conduction region to store information. Example memory structures applicable to memory arrays of computational storage device or system, such as computational SSDs, include 2D structures (e.g., 2D flash structures) and 3D structures (e.g., 3D flash structures). Example array architectures applicable to memory arrays of computational storage device or system, such as computational SSDs, include NOR/OR-type array architectures and AND/NAND-type array architectures.

It is understood that the foregoing disclosure presents implementations, variations, embodiments, and examples in an intended illustrative sense rather than in a limiting sense. It is contemplated that modifications and combinations are discernible that will be within the spirit of the disclosure and the scope of the following claims.

What is claimed is:

1. A computational storage device for disk approximate nearest neighbor (DiskANN) search, comprising:
    a NAND memory array, configured to store a plurality of node chunks corresponding to a plurality of nodes of the DiskANN;

a non-volatile memory array, configured to store a plurality of product quantization (PQ) vectors corresponding to the plurality of nodes in the plurality of node chunks; and a processor unit, coupled to the NAND memory array and the non-volatile memory array, wherein the processor unit is configured to:

execute DiskANN search among the plurality of node chunks in the NAND memory array and the plurality of PQ vectors in the non-volatile memory array according to a received search instruction, and output a search result, wherein the non-volatile memory array is a phase change memory (PCM) array, a NOR memory array, a 3D NOR memory array, a magnetoresistive random access memory (MRAM) array or a resistive random access memory (RRAM) array, wherein each of the plurality of node chunks comprises a node vector data, a number of neighboring nodes, and a plurality of identifiers of neighboring nodes, of each of the plurality of nodes.

2. The computational storage device according to claim 1, wherein the processor unit executing DiskANN search while receiving the search instruction comprises:

comparing a graph index corresponding to the plurality of node chunks, with a query condition of the search instruction, to obtain a near node of the plurality of nodes, in the plurality of node chunks, corresponding to comparison of the graph index;

based on respective identifiers of neighboring nodes of the near node, in the plurality of node chunks stored in the NAND memory array, obtaining a plurality of respective PQ vectors of neighboring nodes corresponding to the respective identifiers of neighboring nodes of the near node, from the plurality of PQ vectors stored in the non-volatile memory array;

comparing the plurality of respective PQ vectors of the neighboring nodes of the near node for obtaining a nearest node nearest to the query condition, from the neighboring nodes; and using the nearest node as the near node and repeating the above steps until k nodes nearest to the query condition are obtained, which search result includes the k nodes as a Top-K search result, wherein k is an integer greater than or equal to one.

3. The computational storage device according to claim 2, wherein the graph index stores in the non-volatile memory array.

4. The computational storage device according to claim 2, further comprising a dynamic memory array coupled to the processing unit and configured to store the graph index.

5. The computational storage device according to claim 2, wherein the dynamic memory array is a dynamic random-access memory (DRAM) array.

6. A computational storage system for DiskANN search, comprising:

a computational storage device, comprising:

a NAND memory array, configured to store a plurality of node chunks corresponding to a plurality of nodes of the DiskANN; and a processor unit, coupled to the NAND memory array; and a non-volatile memory device including a non-volatile memory array configured to store a plurality of PQ vectors corresponding to the plurality of nodes in the plurality of node chunks; and wherein the non-volatile memory device is coupled to the processor unit, and the processor unit is configured to:

execute DiskANN search among the plurality of node chunks in the NAND memory array of the computational storage device and the plurality of PQ vectors in the non-volatile memory array of the non-volatile memory device according to a received search instruction, and output a search result, wherein the non-volatile memory array is a PCM array, a NOR memory array, a 3D NOR memory array, a MRAM array or a RRAM array, wherein each of the plurality of node chunks comprises a node vector data, a number of neighboring nodes, and a plurality of identifiers of neighboring nodes, of each of the plurality of nodes.

7. The computational storage system according to claim 6, wherein the processor unit executing DiskANN search while receiving the search instruction comprises:

comparing a graph index corresponding to the plurality of node chunks, with a query condition of the search instruction, to obtain a near node of the plurality of nodes, in the plurality of node chunks, corresponding to comparison of the graph index;

based on respective identifiers of neighboring nodes of the near node, in the plurality of node chunks stored in the NAND memory array, obtaining a plurality of respective PQ vectors of neighboring nodes corresponding to the respective identifiers of neighboring nodes of the near node, from the plurality of PQ vectors stored in the non-volatile memory array;

comparing the plurality of respective PQ vectors of the neighboring nodes of the near node for obtaining a nearest node nearest to the query condition, from the neighboring nodes; and using the nearest node as the near node and repeating the above steps until k nodes nearest to the query condition are obtained, which search result includes the k nodes as a Top-K search result, wherein k is an integer greater than or equal to one.

8. The computational storage system according to claim 7, wherein the graph index stores in the non-volatile memory array.

9. The computational storage system according to claim 7, wherein the computational storage device further comprises a dynamic memory array coupled to the processing unit and configured to store the graph index.

10. The computational storage system according to claim 9, wherein the dynamic memory array is a DRAM array.

11. An operation method for a memory device, comprising:

storing a plurality of node chunks of a plurality of nodes generated by a DiskANN regarding a database, in a NAND memory array of the memory device;

storing a plurality of PQ vectors corresponding to the plurality of nodes in the plurality of node chunks, in a non-volatile memory array of the memory device; and executing, by a processing unit of the memory device, a DiskANN search among the plurality of node chunks in the NAND memory array and the plurality of PQ vectors in the non-volatile memory array according to a received search instruction, and outputting a search result, wherein the non-volatile memory array is a PCM array, a NOR memory array, a 3D NOR memory array, a MRAM array or a RRAM array, wherein each of the plurality of node chunks comprises a node vector data, a number of neighboring nodes, and a plurality of identifiers of neighboring nodes, of each of the plurality of nodes.

12. The operation method according to claim 11, wherein executing, by a processing unit of the memory device, the DiskANN search comprises:

comparing a graph index corresponding to the plurality of node chunks, with a query condition of the search instruction, to obtain a near node of the plurality of nodes, in the plurality of node chunks, corresponding to comparison of the graph index;

based on respective identifiers of neighboring nodes of the near node, in the plurality of node chunks stored in the NAND memory array, obtaining a plurality of respective PQ vectors of neighboring nodes corresponding to the respective identifiers of neighboring nodes of the near node, from the plurality of PQ vectors stored in the non-volatile memory array;

comparing the plurality of respective PQ vectors of the neighboring nodes of the near node for obtaining a nearest node nearest to the query condition, from the neighboring nodes; and using the nearest node as the near node and repeating the above steps until k nodes nearest to the query condition are obtained, which search result includes the k nodes as a Top-K search result, wherein k is an integer greater than or equal to one.

13. The operation method according to claim 12, wherein the graph index stores in the non-volatile memory array.

14. The operation method according to claim 12, wherein the graph index is stored in a dynamic memory array of the computational storage device, and the dynamic memory array is coupled to the processing unit.

15. The operation method according to claim 14, wherein the dynamic memory array is a DRAM array.

\* \* \* \* \*